(12) United States Patent
Zhou et al.

(10) Patent No.: US 8,968,103 B2
(45) Date of Patent: Mar. 3, 2015

(54) SYSTEMS AND METHODS FOR DIGITAL MULTIMEDIA CAPTURE USING HAPTIC CONTROL, CLOUD VOICE CHANGER, AND PROTECTING DIGITAL MULTIMEDIA PRIVACY

(71) Applicants: Andrew H B Zhou, Tiburon, CA (US); Tiger T G Zhou, Tiburon, CA (US); Dylan T X Zhou, San Gabriel, CA (US)

(72) Inventors: Andrew H B Zhou, Tiburon, CA (US); Tiger T G Zhou, Tiburon, CA (US); Dylan T X Zhou, San Gabriel, CA (US)

(*) Notice: Subject to any disclaimer, the term of this patent is extended or adjusted under 35 U.S.C. 154(b) by 0 days.

(21) Appl. No.: 14/198,683

(22) Filed: Mar. 6, 2014

(65) Prior Publication Data

US 2014/0189354 A1 Jul. 3, 2014

Related U.S. Application Data

(63) Continuation-in-part of application No. 13/857,308, filed on Apr. 5, 2013, and a continuation-in-part of application No. 13/287,279, filed on Nov. 2, 2011, and a continuation-in-part of application No. 13/343,044, filed on Jan. 4, 2012, and a continuation-in-part of application No. 14/165,826, filed on Jan. 28, 2014, and a continuation-in-part of application No. 13/973,146, filed on Aug. 22, 2013, and a continuation-in-part of application No. 13/776,852, filed on Feb. 26, 2013.

(51) Int. Cl.
| | |
|---|---|
| *A63F 9/24* | (2006.01) |
| *H04L 29/06* | (2006.01) |
| *G06Q 30/02* | (2012.01) |
| *H04N 21/414* | (2011.01) |
| *G10L 21/013* | (2013.01) |
| *A63F 13/87* | (2014.01) |
| *A63F 13/54* | (2014.01) |

(52) U.S. Cl.
CPC ..... *H04L 63/0428* (2013.01); *G10L 2021/0135* (2013.01); *G06Q 30/02* (2013.01); *G06Q 30/0209* (2013.01); *G06Q 30/0273* (2013.01); *H04N 21/41407* (2013.01); *A63F 13/87* (2014.09); *A63F 13/54* (2014.09)
USPC .......................................................... 463/42

(58) Field of Classification Search
CPC ........... G11B 2020/10537; G11B 2020/10546; H04N 21/2343; H04N 21/4126; H04N 21/42203; H04N 21/4532; H04N 21/6587; H04N 21/8113; H04N 5/44543; G10L 13/033; G10L 2021/0135; G06F 17/30053; H04M 1/72558; H04M 2250/64; G10H 1/366
USPC ...................................................... 463/35, 42
See application file for complete search history.

(56) References Cited

U.S. PATENT DOCUMENTS

| | | | | |
|---|---|---|---|---|
| 2002/0161882 | A1* | 10/2002 | Chatani | 709/224 |
| 2007/0044137 | A1* | 2/2007 | Bennett | 725/141 |
| 2007/0098368 | A1* | 5/2007 | Carley et al. | 386/96 |
| 2012/0185547 | A1* | 7/2012 | Hugg et al. | 709/206 |

* cited by examiner

*Primary Examiner* — Steve Rowland
(74) *Attorney, Agent, or Firm* — Patent Jurist; Georgiy L. Khayet

(57) ABSTRACT

Provided are computer implemented methods and systems for multimedia capture and encrypting. According to the method, a first user input is received. Based on the first user input, one or more sensors are initiated to capture multimedia to obtain captured multimedia. The method further comprises receiving a second user input. Upon receiving the second user input, data associated with the first user input and the second user input are analyzed. Based on the analysis, one or more multimedia types are selected for recording from the captured multimedia based on predetermined rules. The selected one or more multimedia types are recorded to a memory. The recorded multimedia types are modified by a cloud-based voice changing unit. Furthermore, the recorded multimedia types and the modified multimedia types are encrypted to prepare the one or more multimedia types for sending to an intended recipient.

28 Claims, 6 Drawing Sheets

SYSTEMS AND METHODS FOR DIGITAL MULTIMEDIA CAPTURE USING HAPTIC CONTROL, CLOUD VOICE CHANGER, AND PROTECTING DIGITAL MULTIMEDIA PRIVACY

CROSS-REFERENCE TO RELATED APPLICATIONS

This application is a continuation-in-part of U.S. patent application Ser. No. 13/857,308, entitled "WEARABLE PERSONAL MINI CLOUD GAME AND MULTIMEDIA DEVICE", filed on Apr. 5, 2013; U.S. patent application Ser. No. 13/343,044, entitled "METHODS AND SYSTEMS FOR DISPLAYING AND ADVERTISING PRODUCTS AND SERVICES USING INTERACTIVE MIXED MEDIA", filed on Jan. 4, 2012; U.S. patent application Ser. No. 13/776,852, entitled "WEARABLE PERSONAL DIGITAL FLEXIBLE CLOUD GAME, MULTIMEDIA, COMMUNICATION AND COMPUTING DEVICE", filed on Feb. 26, 2013; U.S. patent application Ser. No. 13/973,146, entitled "WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND", filed on Aug. 22, 2013; U.S. patent application Ser. No. 13/287,279, entitled "METHODS AND SYSTEMS TO ADVERTISE AND SELL PRODUCTS OR SERVICES VIA CLOUD GAMING ENVIRONMENTS", filed on Nov. 2, 2011; and U.S. patent application Ser. No. 14/165,826, entitled "SYSTEMS AND METHODS TO OWN A FREE COMPUTER, A FREE MOBILE DEVICE AND A FREE WEARABLE DEVICE AND LIFE TIME WARRANTY VIA THE SAME DEVICE PAYMENT CASHBACK", filed on Jan. 28, 2014, which are incorporated herein by reference in their entireties for all purposes.

FIELD

This application relates generally to data processing and, more specifically, to methods and system for capturing multimedia, modifying captured multimedia, and protecting multimedia privacy.

BACKGROUND

Personal digital communication devices, such as smartphones, are evolving rapidly and more and more people prefer using personal digital communication devices for a numerous purposes. One of such purposes is to capture details of everyday life, such as to record photo, video, audio, and the like multimedia content. Typically, before capturing the multimedia content, the user has to select a particular type of the multimedia content to be captured. Such selection may take additional time, and a particular moment that the user intended to capture may be missed. Furthermore, switching between different modes of the personal digital communication devices any time when the user wants to capture another type of multimedia content may be annoying for the user.

The user may want to share the captured multimedia content, e.g. by sending the content via e-mail or posting the content in a user account in an online social network. Typically, the multimedia content is sent without any encryption. Therefore, the multimedia content runs a risk of an authorized access. Moreover, the user may want to modify the captured multimedia content before sending.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is a method for multimedia capture and encrypting using an ephemeral messaging and multimedia application associated with a digital device. According to the method, a first user input is received. Based on the first user input, one or more sensors are initiated to capture multimedia to obtain captured multimedia. The method further comprises receiving a second user input. Upon receiving the second user input, data associated with the first user input and the second user input are analyzed. Based on the analysis, one or more multimedia types are selected for recording from the captured multimedia based on predetermined rules. The selected one or more multimedia types are recorded to a memory. The recorded multimedia types are modified by a cloud-based voice changing unit. Furthermore, the one or more of the recorded multimedia types and the modified multimedia types are encrypted to prepare the one or more multimedia types for sending to an intended recipient.

Provided also is a system for multimedia capture and encrypting using an ephemeral messaging and multimedia application associated with a digital device. The system comprises one or more processors. The processors are operable to receive a first user input. Based on the first user input, the processors initiate one or more sensors to capture multimedia. The processors are further operable to receive a second user input. Upon receipt of the second user input, the processors analyze data associated with the first user input and the second user input. Based on the analysis, the processors the processors to select one or more multimedia types for recording from the captured multimedia based on predetermined rules. The processors are further operable to record the selected one or more multimedia types to a memory. The system further comprises a cloud-based voice changing unit operable to modify the one or more recorded multimedia types to obtain one or more modified multimedia types. Furthermore, the system comprises an encryption unit operable to encrypt the one or more of the recorded multimedia types and the modified multimedia types to prepare the one or more multimedia types for sending. The system further comprises one or more sensors and a memory. The sensors are operable to capture multimedia to obtain captured multimedia. The memory is operable to store the one or more multimedia types.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
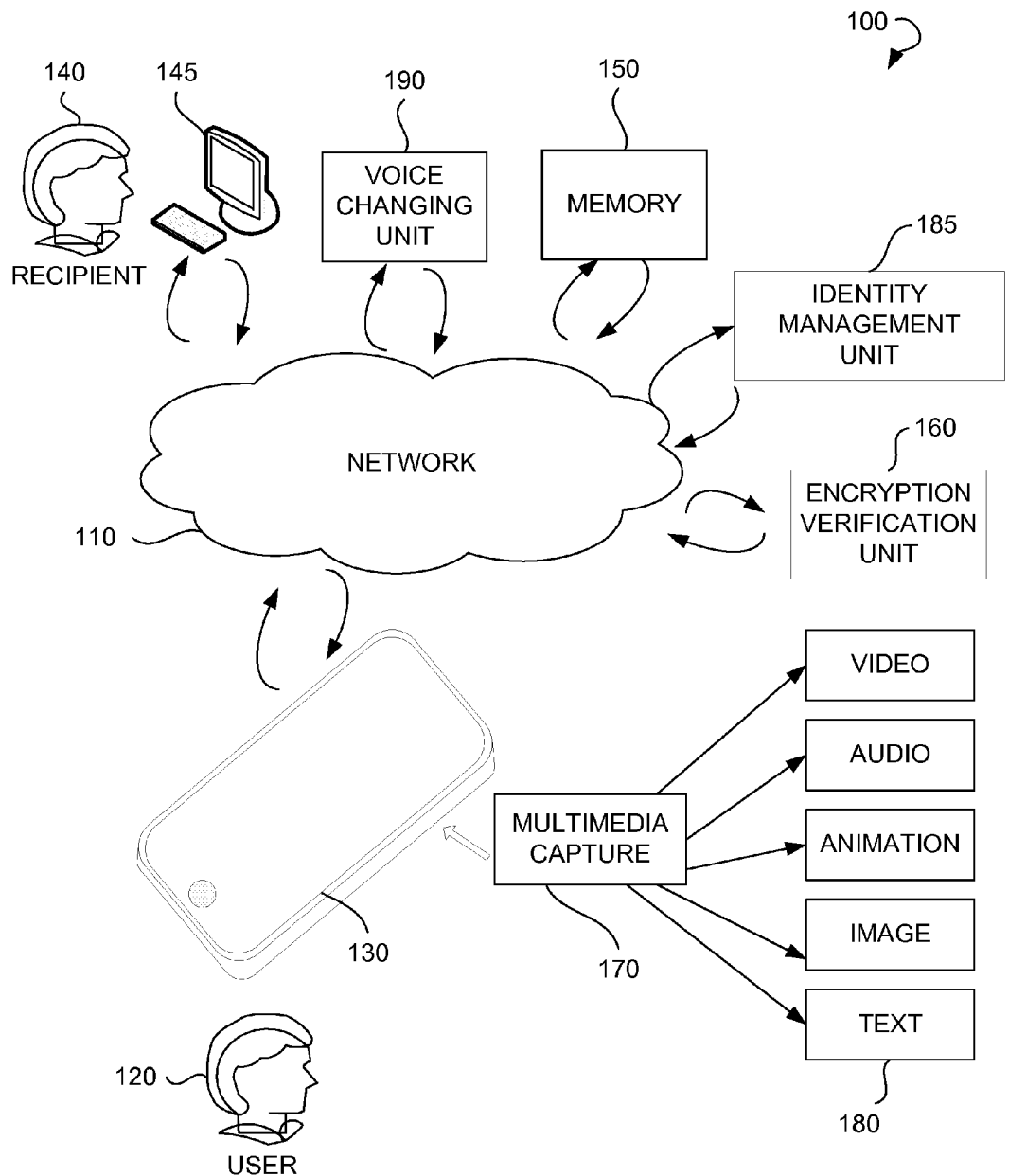
FIG. 1 shows an environment within which a method and a system for multimedia capture and encrypting can be implemented, in accordance with example embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for multimedia capture and encrypting using an ephemeral messaging and multimedia application associated with a digital device are described herein. Recent proliferation of mobile communication devices (e.g., a mobile phone, a smartphone, a tablet personal computer, a laptop, a wearable personal digital device, and other similar devices) that are capable of capturing data and transmitting the data via a network allows implementing these novel methods and systems. Most user of mobile communication devices enjoy capturing different multimedia content, e.g. image, audio, video, and the like, and sharing the captured multimedia content with friends of the user in a social network.

According to the methods and system of the present disclosure, a haptic control is used to select a particular type of multimedia content to be captured. The particular types of multimedia content include image, audio, video, animation, text, and the like. More specifically, when the user wishes to capture the multimedia content, the user starts interaction with a touch display of the smartphone. The user touches the touch display and holds contact of the user finger or stylus for a certain amount of time. A processor of the digital device receives signal about contact of the user with the touch display. The processor considers contact of the user with the touch display as a command to start capturing multimedia content. The processor sends a command to a sensor, such as a camera, of the digital device to capture video. At the same time, the processor starts timer to determine the duration of the touch contact of the user with the touch display.

After the certain amount of time, the user stops touching the touch display. The processor received signal about absence of the touch contact of the user with the touch display. The processor stops the timer. Based on the duration of the touch contact measured by the timer, the processor selects a particular type of multimedia to be stored on the mobile device. All particular types of multimedia content are obtained based on processing the captured video.

The duration of touch contact of the user with the touch display may be preliminary determined for each type of multimedia content. As an example, during touch contact of the user with the touch display, a pictogram describing type of multimedia content corresponding to the current contact time may be shown on the display. The duration of touch contact for each type of multimedia content may be selected by the user or preset by the processor.

In order to ensure privacy of the recorded multimedia content, the multimedia file is encrypted before sending to any intended recipient. Encryption ensures privacy of multimedia content sent to the intended recipient. The multimedia file is encrypted by assigning a unique key to the multimedia file and storing the unique key in an encryption verification unit. The encryption verification unit may be a cloud keystorage. The recipient, upon receiving the encrypted multimedia file, communicates with the encryption verification unit to request access to the encrypted multimedia file. The encryption verification unit verifies whether the recipient is eligible to read the multimedia file. Based on successful verification, the encryption verification unit provides the recipient with an access to the encrypted multimedia file.

A captured multimedia file may be modified before sending. Modification includes applying voice changing features to the captured multimedia file. The user can apply sound effects in real time to an audio input, or modify existing multimedia files. Modification is performed using a cloud-based voice changing unit.

Referring now to the drawings, FIG. 1 illustrates an environment 100 within which a method and a system for multimedia capture and encrypting using an ephemeral messaging and multimedia application associated with a digital device can be implemented. The environment 100 includes a network 110, a user 120, a digital device 130, a recipient 140, a recipient digital device 145, a memory 150, an identity management unit 185, an encryption verification unit 160, and a cloud-based voice changing unit 190. The digital device 130 and the recipient digital device 145 include a mobile phone, a lap-top, a personal computer (PC), a tablet PC, a smart phone, a wearable personal digital device, a wearable eyeglass communication device, and so forth.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication.

The user 120 includes a person that performs capturing multimedia shown as multimedia capture 170. The multimedia includes different multimedia types 180, such as video, audio, animation, image, text, and the like. The captured multimedia may be stored in the memory 150 or in the digital device 130. The digital device 130 modifies the captured multimedia file using the cloud-based voice changing unit 190.

The user 120 captures multimedia and sends the captured multimedia to the recipient 140. The recipient 140 uses the recipient digital device 145 to receive and review the multimedia received from the user 120. In an example embodiment, the user sends multimedia to an e-mail address, a social network account, or the like of the recipient 140. The digital device 130 encrypts a multimedia file before sending. The encryption details are sent to the encryption verification unit 160 and stored in the encryption verification unit 160. After receiving of the multimedia file by the recipient 140 and an attempt of the recipient 140 to view the multimedia file, the encryption verification unit 160 verifies whether the recipient 140 is allowed to view the multimedia file. The identity management unit 185 verifies identity of the user 120 with existing user accounts.

Figure 2:
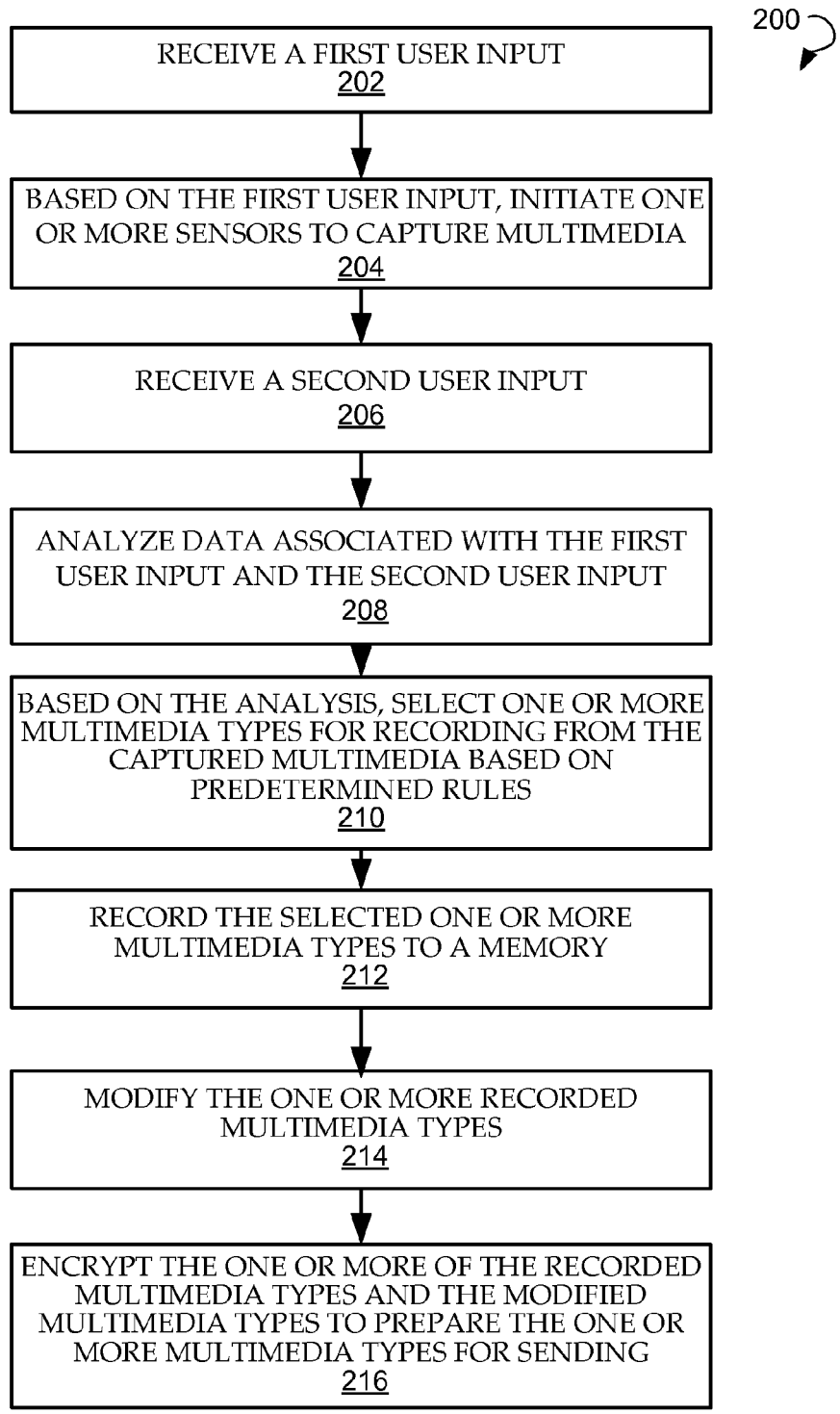
FIG. 2 is a flow chart illustrating a method for multimedia capture and encrypting, in accordance with example embodiments.

FIG. 2 is a flow chart illustrating a method 200 for multimedia capture and encrypting using an ephemeral messaging and multimedia application associated with a digital device, in accordance with certain embodiments. The ephemeral messaging and multimedia application is associated with an application protocol. The application protocol for ephemeral messaging and multimedia uses standard encryption algorithms implemented for mobile and wearable devices. The application protocol is integrated into a communication platform to create a unified mobile and wearable device platform that is private, encrypted and anonymous.

The method 200 may start with receiving, by one or more processors, a first user input at operation 202. In certain embodiments, the first user input includes touch engagement of the user with a display of the digital device. The display may include a touch display. The user can touch the display with a user finger or a stylus. Based on the first user input, a timer is started.

At operation 204, based on the first user input, one or more sensors are initiated to capture multimedia. As a result, captured multimedia is obtained. In an example embodiment, the captured multimedia includes video.

The method 200 may continue with receiving, by the one or more processors, a second user input at operation 206. In an example embodiment, the second user input includes touch release of the user from a display of the digital device. Based on the second user input, the timer is stopped. Furthermore, time between the first user input and the second user input is calculated.

Upon receiving the first user input and the second user input, data associated with the first user input and the second user input is analyzed at operation 208. The analysis is based on calculated time between the first user input and the second user input.

Based on the analysis, one or more multimedia types are selected for recording from the captured multimedia at operation 210. In an example embodiment, the multimedia type includes text, video, image, audio, animation, and the like. The selection is performed based on predetermined rules. The predetermined rules associate the multimedia type with time between the first user input and the second user input. More specifically, each multimedia type corresponds to a particular predetermined time between the first user input and the second user input.

At operation 212, the selected one or more multimedia types are recorded to a memory. All types of multimedia are recorded from the captured multimedia, i.e. from the captured video. More specifically, the text is recorded from the captured video based on one or more of text recognition and speech recognition. The image is recorded from the captured video by selecting a frame in the captured video and storing the frame as an image. The audio is recorded from the captured video by storing an audio content of the captured video. The animation is recorded from the captured video by selecting two or more frames in the captured video. The selected frames are cycled to obtain several images shown one after another. After the last image, the first image is shown to obtain a continuous animation.

After recoding the multimedia types to the memory, the recorded multimedia types are modified at operation 214. Thereby, the one or more modified multimedia types can be obtained. The modification is performed by a cloud-based voice changing unit. The multimedia type is sent to the cloud-based voice changing unit. The cloud-based voice changing unit performs modification of the multimedia type according to user preferences and sends back the modified multimedia type. In an example embodiment, the modifying includes one or more of the following: creating voices for online video games and avatars, voice disguising for anonymity over the radio or internet, changing voices for voiceovers and audio projects, modify user voice based on user preferences, such as make the voice sound like a man, woman, or a child, and so forth. Furthermore, audio effects can be applied to any multimedia files existing on the digital device of the user. In a further example embodiment, the method 200 optionally comprises applying audio effects to the multimedia during the capture of multimedia, e.g. using a microphone.

In order to prepare the one or more multimedia types for sending, the recorded one or more multimedia types are encrypted at operation 216. Therefore, one or more encrypted multimedia types are obtained. The one or more encrypted multimedia types are decryptable by an ephemeral messaging and multimedia application associated with a mobile and wearable device of the recipient. The one or more encrypted multimedia types are removed from the mobile and wearable device of the recipient after being read. Therefore, a free and easy way for user to send encrypted multimedia without a trace is provided. Both the user and the recipient have the ephemeral messaging and multimedia application to communicate. Only the recipient is able to decrypt the received multimedia content once the multimedia content was sent. Unique keys for decryption are stored in the ephemeral messaging and multimedia application associated with the user and the ephemeral messaging and multimedia application associated with the recipient. Thus, the ephemeral messaging and multimedia application is an "off-the-record" multimedia and messaging application enabling removing the multimedia content from the digital device of the user after being sent and from the mobile and wearable device of the recipient after being read. Both the user and the recipient are "of-the-record", i.e. are not associated with the multimedia content after the multimedia content is removed from the digital device of the user and the mobile and wearable device of the recipient.

Encryption ensures that an authorized person never has access to the multimedia content of the user. Therefore, the multimedia content is encrypted directly on the digital device of the user before the multimedia content leaves the digital device and then sent to an intended recipient. In an example embodiment, encryption includes assigning a unique key to each of the recorded multimedia types. Optionally, the method 200 may further comprise sending the unique key to an encryption verification unit. The encryption verification unit may include a key storage. The key storage may include a cloud key storage. In an example embodiment, the key storage includes an open source key storage that provides the user with full control over the storage and protection of the stored unique keys.

Figure 3:
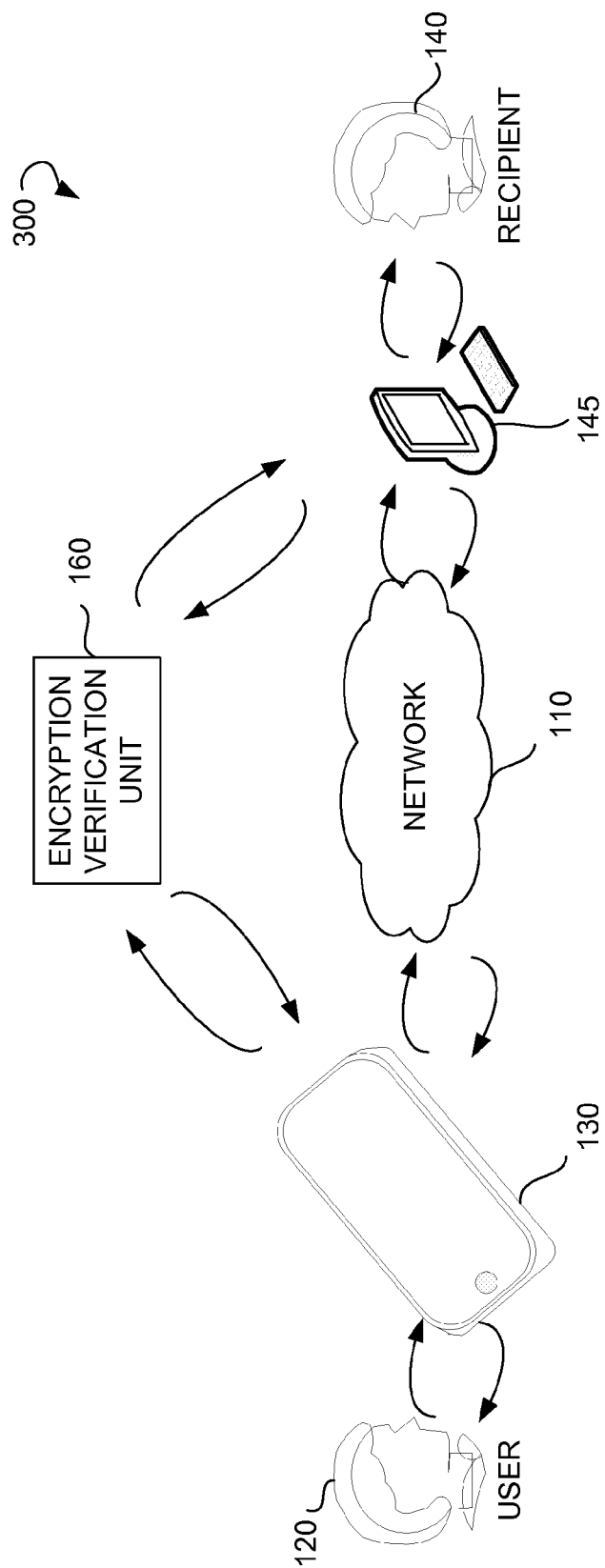
FIG. 3 shows a schematic representation of sending the encrypted multimedia, in accordance with example embodiments.

In a further example embodiment, encryption includes converting files of the recorded one or more multimedia types into Encrypted Trusted Data Format (ETDF) files. The ETDF format is used to wrap and protect the multimedia content and communicate with enabled key storages, which maintain access privileges. FIG. 3 shows a schematic representation 300 of sending the encrypted multimedia content to an intended recipient. The user 120 sends an encrypted multimedia file using the digital device 130. The multimedia content is encrypted and secured inside an ETDF wrapper on the digital device 130. The unique key is assigned to the multimedia content and sent to the encryption verification unit 160. The encrypted multimedia content is sent to the recipient digital device 145 via the network 110. When the intended recipient 140 attempts to open the received encrypted multimedia file of the recipient digital device 145, the ETDF wrapper of the encrypted multimedia file communicates with the key storage, i.e. with to the encryption verification unit 160, to verify that the intended recipient 140 is eligible to view the multimedia content. Upon successful verification, the intended recipient 140 is provided with an access to the encrypted multimedia file.

In further example embodiment, the method for multimedia capture and encrypting comprises receiving from a user a registration request to register the user in a mobile payment service. The user sends the registration request via a mobile payment application associated with the digital device associated with the user. The mobile payment application is operable to provide at least a free Voice over Internet Protocol (VoIP) service, a free Over-the-Top (OTT) service, and so forth. In an example embodiment, the mobile payment application is integrated into the ephemeral messaging and multimedia application.

Figure 4:
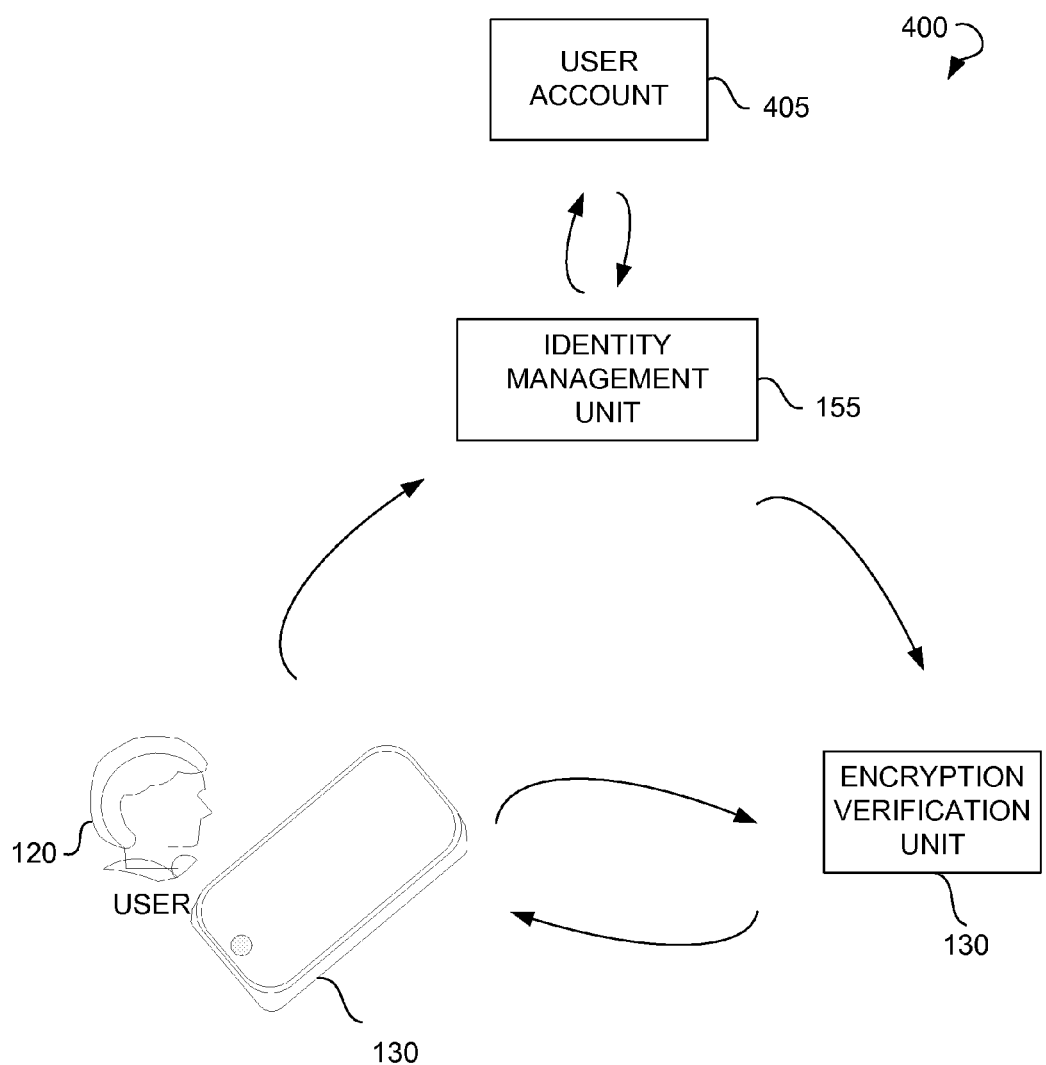
FIG. 4 is a schematic representation of verification of user identity, in accordance with example embodiments.

Optionally, the method for multimedia capture and encrypting further comprises verification of user identity with an existing user account. FIG. 4 is a schematic representation 400 of verification of user identity. When the user 120 sends an encrypted multimedia file using the digital device 130, the digital device 130 communicates with an identity management unit 185. The digital device 130 sends data associated with the user 120 to the identity management unit 185. The data associated with the user 120 is used by the identity management unit 185 to verify whether the user 120 has existing user accounts 405. In an example embodiment, the existing user account 405 includes one or more of an e-mail account, a social network account, a filesharing account, and the like. In particular, example user accounts 405 include Gmail account, Yahoo account, Microsoft account, and the like. The data associated with the user 120 include user name, phone number, a contact card, mobile phone identification number, and the like. The identity management unit 185 communicates the user identity data to the encryption verification unit 160. The encryption verification unit 160 can use the user identity data to allow sending the multimedia content to the existing user account, e.g. sharing the multimedia content in a social network using the existing user account in the social network. Therefore, no new accounts or passwords are needed to send the multimedia content to the existing user account.

Figure 5:
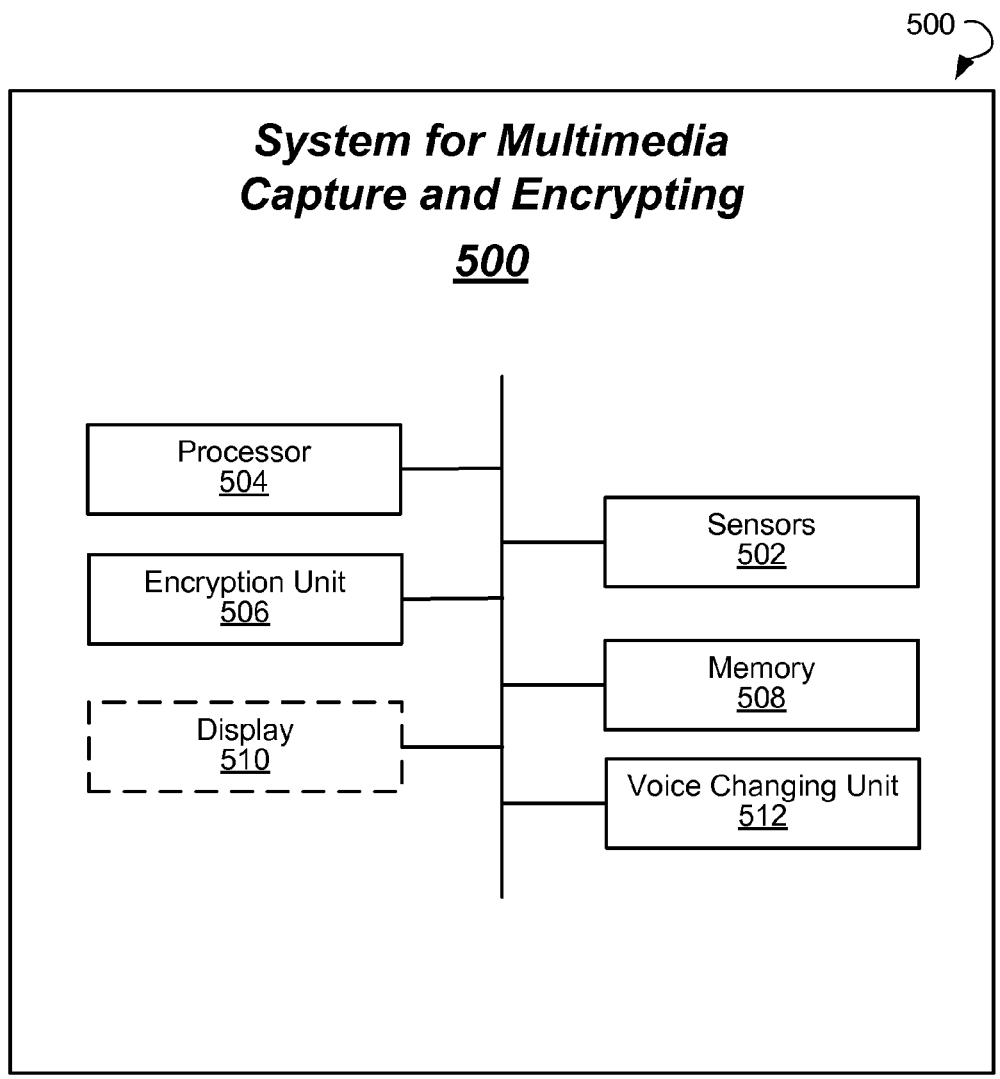
FIG. 5 is a block diagram showing various modules of a system for multimedia capture and encrypting, in accordance with example embodiments.

FIG. 5 is a block diagram showing various modules of a system 500 for multimedia capture and encrypting using an ephemeral messaging and multimedia application associated with a digital device, in accordance with certain embodiments. Specifically, the system 500 includes one or more sensors 502. In an example embodiment, the sensors 520 include a camera. The sensors 520 are operable to capture multimedia to obtain captured multimedia.

The system 500 further includes one or more processors 504. The processor 504 is operable to receive a first user input. In an example embodiment, the first user input includes touch engagement of the user with a display of the digital device. In an example embodiment, the processor 504 is further operable to start a timer based on the first user input.

Based on the first user input, the processor 504 is operable to initiate the one or more sensors 502 to capture multimedia. In an example embodiment, the captured multimedia includes video. The processor 504 is further operable to receive a second user input. In an example embodiment, the second user input includes touch release of the user from a display of the digital device. In an example embodiment, the processor 504 is further operable to stop the timer based on the second user input and calculate time between the first user input and the second user input. The processor 504 analyzes data associated with the first user input and the second user input. The analysis is based on calculated time between the first user input and the second user input. Based on the analysis, the processor 504 selects one or more multimedia types for recording from the captured multimedia based on predetermined rules. In an example embodiment, the multimedia type includes text, video, image, audio, animation, and the like. The predetermined rules associate the multimedia type with time between the first user input and the second user input.

The processor 504 records the selected one or more multimedia types to a memory. In example embodiments, the text is recorded from the captured video based on one or more of text recognition and speech recognition. The image is recorded from the captured video by selecting a frame in the captured multimedia. The audio is recorded from the captured video by selecting audio content in the captured video. The animation is recorded from the captured video by selecting two or more frames in the captured video and cycling the selected two or more frames.

In a further example embodiment, the processor 504 is operable to verify user identity with an existing user account. The existing user account includes one or more of an e-mail account, a social network account, a filesharing account, and so forth.

The system 500 further includes an encryption unit 506. The encryption unit 506 is operable to encrypt the recorded multimedia types to prepare the multimedia types for sending. The encryption includes assigning a unique key to each of the recorded one or more multimedia types. Furthermore, the encryption includes converting the recorded one or more multimedia types into ETDF files. The encryption unit 506 is further operable to send the unique key to an encryption verification unit. The encryption verification unit includes a key storage, such as a cloud key storage and so forth.

The system 500 further includes a memory 508. The memory 508 is operable to store the one or more multimedia types. The system 500 further optionally includes a display 510. In an example embodiment, the display 510 includes a touch display.

The system 500 further includes a voice changer, also referred to as a voice changing unit 512. In an example embodiment, the voice changing unit 512 is cloud-based. The user sends the multimedia type to the cloud-based voice changing unit 512 using the digital device of the user. Furthermore, the user selects modifications to be applied to the multimedia type by the cloud-based voice changing unit 512. The cloud-based voice changing unit 512 performs modification of the multimedia type according to user preferences and sends back the modified multimedia type.

The cloud-based voice changing unit 512 is operable to modify the one or more recorded multimedia types to obtain one or more modified multimedia types. The cloud-based voice changing unit 512 is operable to apply audio effects to the multimedia during the capture of multimedia, e.g. using a microphone. Furthermore, the cloud-based voice changing unit 512 can load and save effect chains for voice modification. The cloud-based voice changing unit 512 is compatible and can work with existing applications and games on the digital device of the user. The cloud-based voice changing unit 512 is further operable to output the modified audio file to speakers of the digital device of the user to enable the user hear the effects live. Being accessed using the digital device, the cloud-based voice changing unit 512 has simple and intuitive interface and causes low CPU usage of the digital device, and, therefore, does not interfere with other running applications on the digital device. The cloud-based voice changing unit 512 has a plurality of built-in voices and sound effects to make the cloud-based changing unit 512 convenient to use.

The cloud-based voice changing unit 512 is optimized for online games in view of ability to morph voice and suppress background voice. Furthermore, the cloud-based voice changing unit 512 enables calling other users via instant messaging and VoIP. For example, the cloud-based voice changing unit 512 can apply such affects as car screeches and drum rolls with a push of a key on the digital device. The cloud-based voice changing unit 512 is operable to create a play list from existing multimedia files on the digital device and broadcast the play list to others users. Many file formats are supported, such as Waveform Audio File format, Ogg format, Windows Media format, MP3 format, and so forth. Files can be paused, stopped, skipped, and the order of the play list changed. The cloud-based voice changing unit 512 can slow down the recording without changing pitch. Optimized for voice, the cloud-based voice changing unit 512 is designed for analysis, transcriptions and documentation of dictations and interviews. The high-quality algorithm maintains vocal clarity at variety of speeds. The annotation feature allows the user to bookmark important parts of the recording.

In further example embodiments, the cloud-based voice changing unit 512 is operable to enable speaking over the Internet and soft-phone using customizable text-to-speech voices with the use of text-to-VoIP plug-in. Such feature is helpful for people who cannot speak with their own voice or who prefers a text alternative to communicating with voice. The cloud-based voice changing unit 512 is useful for users who want to modify conversation environments while doing voice chats in instant messenger programs, or to make humorous fun voice chats and voice calls with PC-to-phone applications, or to do song remixes. The cloud-based voice changing unit 512 stands apart from other online or computer-based voice changing programs because of the unlimited ability of the cloud-based voice changing unit 512 to change and enhance voices and sounds, and the ability to produce high quality audio output.

The cloud-based voice changing unit 512 is further operable to work in real time while using voice chat. For example, with any click on the preset voice, the user can immediately change the voice. For offline voice changing projects, the user can also hear the morphed voice instantly so that the user saves a lot of time to get the desired voice output.

The cloud-based voice changing unit 512 modifies the recorded multimedia types by performing one or more of the following: correct pitch of a vocal track, align vocal tracks together to make the vocal tracks tight and effective, fix the rhythm of a particular vocal line, give a "robotic" effect to the vocal track, transpose the vocal track, add backup vocals effect to the vocal track, reverse the effects of poor pitch correction if the correction is too evident, remove noisy plosives, soften harsh "s" sounds with exaggerated sibilance, clean the vocal track from noise on the backup, and so forth. Typically, a voice changer can increase or decrease voice pitch by one or two octaves without creating the "digital" sounding voice.

The cloud-based voice changing unit 512 may use an audio driver that should be used for recording the modified sound. That audio driver should also be used when configuring an application that the user wants to use. For example, the user can set "fake voice" mode of the cloud-based voice changing unit 512 as a default mode.

In further example embodiment, effects that can be applied to the voice include modifying the voice by modifying several parameters like pitch, format, noise threshold, and so on. Next, the 'robotic effect' may be used to modify the voice, making it seem like a robot voice. The next effect is the echo, duration and the strength of which can be configured by the user. Furthermore, the cloud-based voice changing unit 512 changes the pitch-sensitive fundamental waves of voice on the recorded multimedia file. Pitch is only one of the elements of the voice, therefore, there is a limitation as to how much change can be made to avoid a digital sounding voice. To apply the effects, the cloud-based voice changing unit 512 can use electronic circuits to change or buffer the unnatural sounds.

In a further example embodiment, the cloud-based voice changing unit 512 is used to alter voice of a user to either make voice sound like voice of somebody else or to disguise voice of user. Thus, the cloud-based voice changing unit 512 changes tone or pitch, add distortion to voice of the user, and a combination of all of the above.

Figure 6:
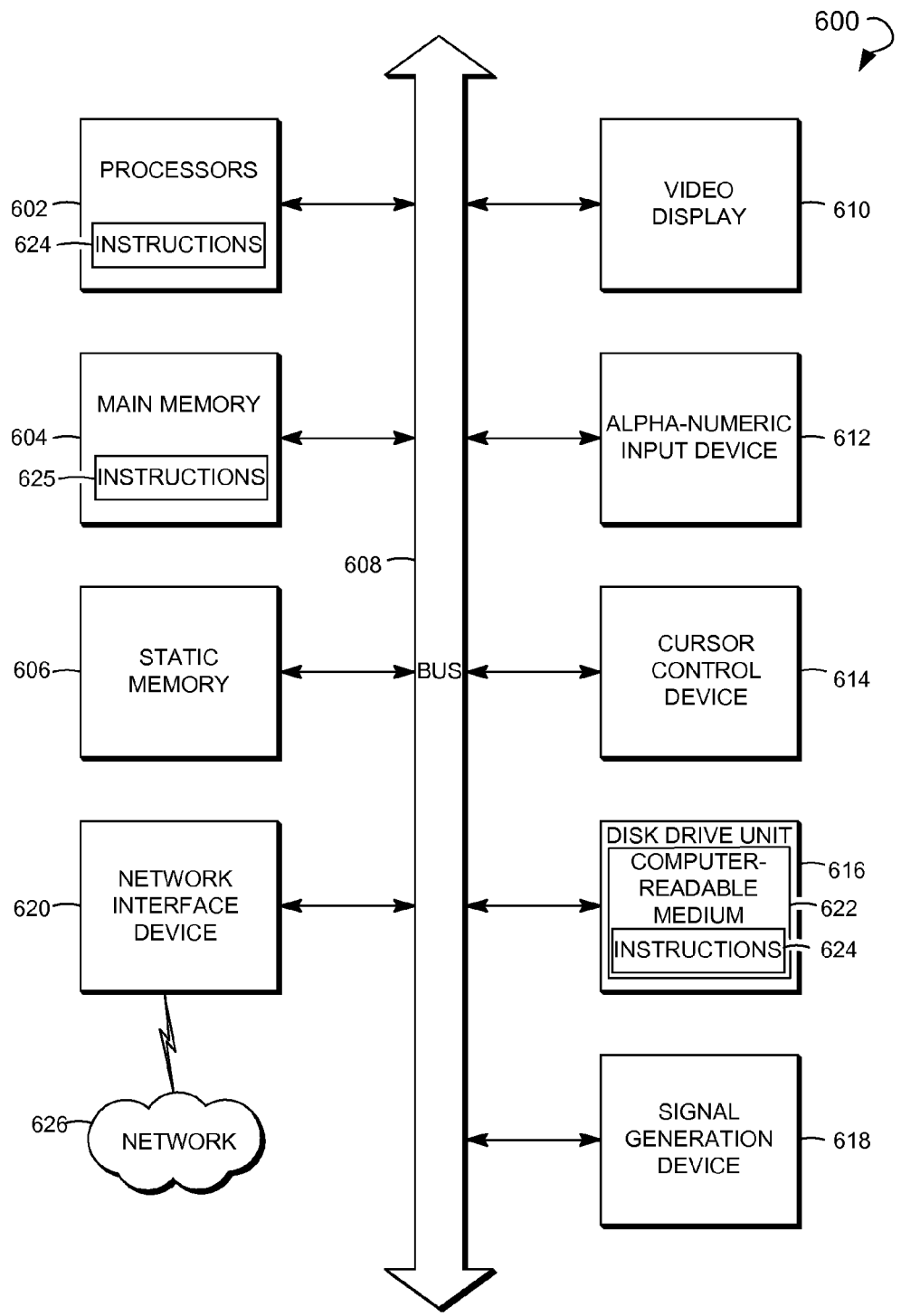
FIG. 6 is a schematic diagram illustrating an example of a computer system for performing any one or more of the methods discussed herein.

FIG. 6 shows a diagrammatic representation of a machine in the example electronic form of a computer system 600, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 may also include an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a non-transitory computer-readable medium 622, on which is stored one or more sets of instructions and data structures (e.g., instructions 624) embodying or utilized by any one or more of the methodologies or functions described herein. The instructions 624 may also reside, completely or at least partially, within the main memory 604 and/or within the processors 602 during execution thereof by the computer system 600. The main memory 604 and the processors 602 may also constitute machine-readable media.

The instructions 624 may further be transmitted or received over a network 626 via the network interface device 620 utilizing any one of a number of well-known transfer protocols (e.g., Hyper Text Transfer Protocol (HTTP)).

While the computer-readable medium 622 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for multimedia capture and encrypting have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for multimedia capture and encrypting using an ephemeral messaging and multimedia application associated with a digital device, the method comprising:
   receiving, by one or more processors, a first user input;
   based on the first user input, initiating one or more sensors to capture multimedia to obtain captured multimedia;
   receiving, by the one or more processors, a second user input;
   analyzing, by the one or more processors, data associated with the first user input and the second user input;
   based on the analysis, selecting, by the one or more processors, one or more multimedia types for recording from the captured multimedia based on predetermined rules;
   recording, by the one or more processors, the selected one or more multimedia types to a memory to obtain one or more recorded multimedia types;
   modifying, by a cloud-based voice changing unit, the one or more recorded multimedia types to obtain one or more modified multimedia types;
   encrypting, by an encryption unit, one or more of the recorded more multimedia types and the modified multimedia types to obtain one or more encrypted multimedia types, wherein the one or more encrypted multimedia types are decryptable by an ephemeral messaging and multimedia application associated with a mobile and wearable device of a recipient, the one or more encrypted multimedia types being removed from the mobile and wearable device of the recipient after being read; and
   receiving, by the one or more processors, from a user, a registration request to register the user in a mobile payment service, wherein the user sends the registration request via a mobile payment application associated with the digital device associated with the user, the mobile payment application providing at least a free Voice over Internet Protocol (VoIP) service and a free Over-the-Top (OTT) service;
   wherein the ephemeral messaging and multimedia application is associated with an application protocol, the application protocol being integrated into a communication platform.

2. The method of claim 1, wherein the first user input includes touch engagement of the user with a display of the digital device; and
   wherein the second user input includes touch release of the user from a display of the digital device.

3. The method of claim 1, further comprising:
   based on the first user input, starting a timer; and
   based on the second user input, stopping the timer; and
   calculating time between the first user input and the second user input.

4. The method of claim 3, wherein the analyzing is based on the time between the first user input and the second user input.

5. The method of claim 1, wherein the multimedia type includes text, video, image, audio, and animation.

6. The method of claim 1, wherein the predetermined rules associate the multimedia type with time between the first user input and the second user input.

7. The method of claim 1, wherein the captured multimedia includes video.

8. The method of claim 7, wherein the text is recorded from the captured multimedia based on one or more of text recognition and speech recognition.

9. The method of claim 7, wherein the image is recorded from the captured multimedia by selecting a frame in the captured multimedia.

10. The method of claim 7, wherein the audio is recorded from the captured multimedia by selecting audio content in the captured multimedia.

11. The method of claim 7, wherein the animation is recorded from the captured multimedia by selecting two or more frames in the captured multimedia and cycling the selected two or more frames.

12. The method of claim 1, wherein the encrypting includes assigning a unique key to each of the recorded multimedia types and the modified multimedia types.

13. The method of claim 12, further comprising sending the unique key to an encryption verification unit, wherein the encryption verification unit includes a key storage.

14. The method of claim 1, wherein the encrypting includes converting the recorded multimedia types and the modified multimedia types into Encrypted Trusted Data Format (ETDF) files.

15. The method of claim 1, further comprising verifying user identity with an existing user account.

16. The method of claim 15, wherein the existing user account includes one or more of an e-mail account, a social network account, and a filesharing account.

17. The method of claim 1, wherein the modifying includes one or more of the following: creating voices for online video games and avatars, voice disguising for anonymity over the radio or internet, changing voices for voiceovers and audio projects, modify user voice based on user preferences.

18. The method of claim 1, further comprising applying audio effects to the multimedia during the capture of multimedia.

19. A system for multimedia capture and encrypting using an ephemeral messaging and multimedia application associated with a digital device, the system comprising:
one or more sensors operable to capture multimedia to obtain captured multimedia;
one or more processors operable to:
receive a first user input;
initiate, based on the first user input, the one or more sensors to capture multimedia;
based on the first user input, start a timer;
receive a second user input;
based on the second user input, stop the timer;
analyze data associated with the first user input and the second user input, the analyzing including calculating time between the first user input and the second user input;
based on the analysis, select one or more multimedia types for recording from the captured multimedia based on predetermined rules; and
record the selected one or more multimedia types to a memory to obtain one or more recorded multimedia types; and
a cloud-based voice changing unit operable to:
modify the one or more recorded multimedia types to obtain one or more modified multimedia types;
an encryption unit operable to:
encrypt one or more of the recorded multimedia types and the modified multimedia types to prepare the one or more multimedia types for sending; and
a memory operable to store the one or more multimedia types.

20. The system of claim 19, wherein the first user input includes touch engagement of the user with a display of the digital device; and
wherein the second user input includes touch release of the user with a display of the digital device.

21. The system of claim 19, wherein the analyzing is based on the time between the first user input and the second user input.

22. The system of claim 19, wherein the cloud-based voice changing unit is operable to create a play list from the multimedia types on the digital device and broadcast the created play list.

23. The system of claim 19, wherein the cloud-based voice changing unit is operable to slow down the recorded multimedia type without changing pitch of the recorded multimedia type.

24. The system of claim 19, wherein the cloud-based voice changing unit is operable to enable one or more of the following: making a voice chat with PC-to-phone applications, making a voice calls with PC-to-phone applications, making a song remix, and speaking over the Internet and soft-phone using customizable text-to-speech voices.

25. The system of claim 19, wherein the cloud-based voice changing unit is operable to work in real time while using voice chat.

26. The system of claim 19, wherein the cloud-based voice changing unit is operable to modify the recorded multimedia types by performing one or more of the following: correcting pitch of a vocal track, aligning vocal tracks together, fixing rhythm of a particular vocal line, applying a robotic effect to the vocal track, transposing a vocal track, adding backup vocals to the vocal track, reversing the effects of pitch correction, adding distortion to the vocal track, changing pitch-sensitive fundamental waves of voice in the recorded multimedia type, and morphing voice and suppressing background voice to obtain voice optimized for online games.

27. The system of claim 19, wherein the modifying includes modifying pitch, format, noise threshold, and applying echo.

28. The system of claim 19, wherein the cloud-based voice changing unit is operable to use electronic circuits to change or buffer unnatural sounds.

* * * * *